(12) United States Patent
Jung et al.

(10) Patent No.: US 12,502,938 B2
(45) Date of Patent: Dec. 23, 2025

(54) DETACHABLE MODULAR DOOR FOR A VEHICLE

(71) Applicants: HYUNDAI MOTOR COMPANY, Seoul (KR); KIA CORPORATION, Seoul (KR); AJIN INDUSTRIAL CO., LTD., Gyeongsan-si (KR)

(72) Inventors: Doo-Young Jung, Hwaseong-si (KR); Ki-Hyun Choi, Hwaseong-si (KR); Hyung-Sik Choi, Hwaseong-si (KR); Jeung-Tae Kim, Hwaseong-si (KR); Nam-Hee Yun, Hwaseong-si (KR); Hoon-Ju Jo, Hwaseong-si (KR)

(73) Assignees: HYUNDAI MOTOR COMPANY, Seoul (KR); KIA CORPORATION, Seoul (KR); AJIN INDUSTRIAL CO., LTD., Gyeongsan-si (KR)

( * ) Notice: Subject to any disclaimer, the term of this patent is extended or adjusted under 35 U.S.C. 154(b) by 0 days.

(21) Appl. No.: 18/783,164

(22) Filed: Jul. 24, 2024

(65) Prior Publication Data
US 2025/0214403 A1    Jul. 3, 2025

(30) Foreign Application Priority Data
Dec. 28, 2023 (KR) .......................... 10-2023-0195628

(51) Int. Cl.
*B60J 5/04* (2006.01)
*B60J 1/17* (2006.01)
*B60R 13/02* (2006.01)

(52) U.S. Cl.
CPC .............. *B60J 5/0476* (2013.01); *B60J 1/17* (2013.01); *B60J 5/0413* (2013.01); *B60J 5/0415* (2013.01); *B60J 5/0463* (2013.01); *B60J 5/0469* (2013.01); *B60J 5/0481* (2013.01); *B60R 13/0243* (2013.01)

(58) Field of Classification Search
CPC ...................................... B60J 5/0476
See application file for complete search history.

(56) References Cited

U.S. PATENT DOCUMENTS

| | | | | |
|---|---|---|---|---|
| 4,866,883 A * | 9/1989 | Brown | ............... | B60J 5/0425 296/202 |
| 5,127,191 A * | 7/1992 | Ohta | ............ | B60J 5/0476 296/147 |
| 5,417,470 A * | 5/1995 | Holt | ............ | B60J 5/0416 296/187.12 |

(Continued)

FOREIGN PATENT DOCUMENTS

| | | |
|---|---|---|
| JP | H09267638 A | 10/1997 |
| JP | 2575618 Y2 | 7/1998 |

(Continued)

*Primary Examiner* — Catherine A Kelly
(74) *Attorney, Agent, or Firm* — Lempia Summerfield Katz LLC

(57) ABSTRACT

A detachable modular vehicle door includes a frame module hinge-connected to a vehicle and configured to be opened and closed, a skin module assembled to the frame module and configured to cover an outside of the frame module, and an interior module disposed inside the frame module and configured to cover an inside of the frame module and assembled to the skin module with the frame module interposed therebetween.

15 Claims, 17 Drawing Sheets

(56) References Cited

U.S. PATENT DOCUMENTS

| | | | |
|---|---|---|---|
| 6,343,832 B1* | 2/2002 | Queener | B60J 5/0476 |
| | | | 296/153 |
| 10,562,380 B2* | 2/2020 | Marchetti | B60J 5/0425 |
| 10,836,240 B2* | 11/2020 | Whipps | B60J 5/0437 |
| 11,052,733 B2* | 7/2021 | Patel | B60J 5/0476 |
| 11,135,906 B2* | 10/2021 | Getzschman | B60J 1/10 |
| 11,345,219 B2* | 5/2022 | Getzschman | B60J 5/0402 |
| 11,390,147 B2 | 7/2022 | Krapfl | |
| 12,151,543 B2* | 11/2024 | Krolewski | B60J 5/0469 |
| 12,304,286 B2* | 5/2025 | Bowman | B60J 5/0487 |
| 2001/0037607 A1 | 11/2001 | Pfeiffer | |
| 2002/0007598 A1 | 1/2002 | Nishikawa | |
| 2020/0079192 A1* | 3/2020 | Getzschman | B60J 5/0476 |
| 2022/0111708 A1* | 4/2022 | Krapfl | B60J 5/0463 |

FOREIGN PATENT DOCUMENTS

| | | | | |
|---|---|---|---|---|
| KR | 200149694 Y1 | 6/1999 | | |
| KR | 101830299 B1 | 2/2018 | | |
| WO | WO-2015083772 A1 * | 6/2015 | | B60H 1/00378 |

* cited by examiner

DETACHABLE MODULAR DOOR FOR A VEHICLE

CROSS-REFERENCE TO RELATED APPLICATION

This application claims priority to Korean Patent Application No. 10-2023-0195628, filed on Dec. 28, 2023, which is incorporated herein by reference in its entirety.

BACKGROUND OF THE DISCLOSURE

Technical Field

The present disclosure relates to a vehicle door to be installed on side surfaces of a vehicle, and more specifically, to a detachable modular type door, which is easily attached to or detached from a vehicle body.

Description of Related Art

Doors for occupants to get in and out of a vehicle are installed on side surfaces of the vehicle.

The doors are typically manufactured by processing metal panels and installed on a vehicle body.

Generally, the doors are hinge-connected to the vehicle body and used in a state of not being intended to be readily or easily detachable from the vehicle body.

However, in some vehicles such as a sport utility vehicle (SUV), as shown in FIG. 1, a door 101 is detachably installed to a vehicle 100 in order to provide an extreme sense of openness in an outdoor environment. In a case in which a door hinge (not shown) is exposed to an outside of the vehicle 100 to facilitate the separation of the door 101, the user may remove the door 101 by separating the door 101 from the door hinge.

Alternatively, the user may apply another door 102 as a replacement after separating the originally installed door 101. For example, as illustrated in FIG. 2, the door 102 having only a frame without panels is installed to maximize the sense of openness while driving in a rough terrain and to perform minimum functions such as preventing occupants from exiting or preventing intruders from entering from outside of the vehicle 100.

Thereafter, in order to start driving on a paved road, the original door 101 should be re-mounted on the vehicle 100.

However, since the door 101 manufactured by assembling metallic frames and panels is inevitably heavy. Thus, there is a problem in that the door 101 is not easily attached to or detached from the vehicle 100.

In addition, in order to detach or attach the door 101 for replacement, the door 101 is typically separated from the door hinge by using tools, which is inconvenient and time-consuming work to do.

SUMMARY OF THE DISCLOSURE

The present disclosure is provided to solve the above problems and is directed to providing a detachable modular type door for a vehicle. The door has a skin module and an interior module that may be attached to or detached from a vehicle body to maximize a sense of openness of the vehicle while driving and to facilitate attachment and detachment of the door.

In order to achieve the objectives, a detachable modular type door for a vehicle according to the present disclosure is provided. The door includes a frame module hinge-connected to the vehicle and configured to be opened and closed. The door has a skin module assembled to the frame module and configured to cover an outside of the frame module. The door has an interior module disposed inside the frame module to cover an inside of the frame module and assembled to the skin module with the frame module interposed therebetween.

The frame module may include a main frame formed on a perimeter of the frame module and fastened to a door hinge.

The frame module may further include an internal frame located inside the frame module and having both end portions fastened to the main frame.

The frame module may further include a frame cover made of a plastic material configured to cover the outside of the frame module.

A flange part may extend upward from an upper portion of the frame cover by a predetermined height.

The skin module may include a skin panel exposed to an outside of the skin module and may include a fastening panel disposed inside the skin panel, attached to the skin panel, and coupled to the interior module.

The detachable modular type door for a vehicle may further include a belt rail attached to an inner upper portion of the fastening panel in a longitudinal direction of the vehicle. The door may also include a locking member fixedly installed inside the fastening panel and a locking lever passing through the flange part of the frame module and the belt rail. The locking lever may be assembled to the locking member to fasten the skin module and the frame module, wherein the locking lever may be rotated to be locked to or unlocked from the locking member.

The locking lever may include a manipulation knob and a hooking piece fixed by being hooked to a fixing hole formed in the locking member according to the rotation of the locking lever. The fixing hole may be configured to allow the hooking piece to pass through or may be configured to constrain the hooking piece after the hooking piece passes through the fixing hole.

The fixing hole may be formed to have a diameter as varying at different angles, i.e., rotation angles, of the locking lever. The fixing hole may be formed in a shape corresponding to the hooking piece.

A hooking protrusion may protrude from each of the locking lever and the locking member toward each other and may be formed on each of the locking lever and the locking member to prevent the locking lever from being rotated in an opposite direction when the locking lever is fixed to the locking member. A stopper, configured to restrain the rotation of the locking lever, may be formed on the locking member.

A reference hole and a plurality of coupling holes to which the interior module is fastened may be formed in the fastening panel.

A single reference hole may be formed at a predetermined position of the fastening panel and the plurality of coupling holes may be formed along a perimeter of the fastening panel at intervals.

A washer may be fitted in a washer hole formed in a portion of the fastening panel in which each of the coupling holes is formed. The washer holes may be in the form of an elongated hole along a virtual line intersecting a center of each washer hole and the reference hole.

A portion of the fastening panel in which the reference hole and the coupling holes are formed may be constructed to protrude in an inward direction of the vehicle, i.e., in a direction toward an interior of the vehicle.

The skin panel and the fastening panel may be made of a plastic material and may be joined with an adhesive.

A detachable modular type door for a vehicle may include a frame module hinge-connected to the vehicle and configured to be opened and closed. The door may include a skin module assembled to the frame module and configured to cover an outside of the frame module. The door may include an interior module disposed inside the frame module and configured to cover an inside of the frame module and assembled to the skin module with the frame module interposed therebetween. The interior module may include a window glass installed on the door to move up and down, a regulator configured to move the window glass up and down, a trim exposed to the interior, i.e., in an inward direction of the vehicle, an inner panel to which the regulator and the trim are assembled, and a fastening unit installed on the trim for coupling the interior module to the skin module.

The fastening unit may include a plurality of fastening members passing through the frame module, fitted into the reference hole and each of the coupling holes formed in the fastening panel of the skin module and installed at intervals, a wire connecting and interworking the fastening members, and a manipulation lever rotatably installed at one side of the trim and configured to manipulate the wire by rotation. When the manipulation lever is rotated, the fastening member may be rotated and compressed to expand a diameter of the fastening member in a width direction and fixed to the reference hole and the coupling holes.

The frame module may include a main frame formed on a perimeter of the frame module and fastened to a door hinge. The frame module may also include an internal frame located inside the frame module and having both ends fastened to the main frame to reinforce a rigidity of the frame module or support a collision load in the event of a collision.

The frame module may further include a frame cover made of a plastic material configured to cover the outside of the frame module. The frame cover may be fabricated in a shape and may have components which are detachably assembled to the skin module or the interior module according to a user's choice.

The skin module may further include: a skin panel exposed to an outside of the skin module; a fastening panel disposed inside the skin panel, attached to the skin panel, and coupled to the interior module; a locking member fixedly installed inside the fastening panel; and a locking lever passing through the frame module and assembled to the locking member. The locking lever is configured to rotate to be locked to or unlocked from the locking member.

According to the detachable modular type door for a vehicle having the above configuration, it is possible to easily attach or detach the skin module and the interior module from the frame module fixed to the body of the vehicle via only simple manipulation by the user without using a separate dedicated tool. Therefore, when the skin module and the interior module are separated, the side surfaces of the vehicle occupied by the door may be opened, thereby obtaining the extreme sense of openness.

In addition, since the skin module is made of a plastic material, it is possible to reduce the weight of the skin module and facilitate attachment and detachment thereof.

In addition, even when the frame module, the skin module, and the interior module are thermally expanded differently, it is possible to absorb thermal expansion of such modules, thereby preventing the deformation of the vehicle door due to a change in temperature.

In addition, since the skin module and the interior module are easily detachable, it is possible to apply the skin module or the interior module with the desired design or color.

DESCRIPTION OF SPECIFIC EMBODIMENTS

Figure 1:
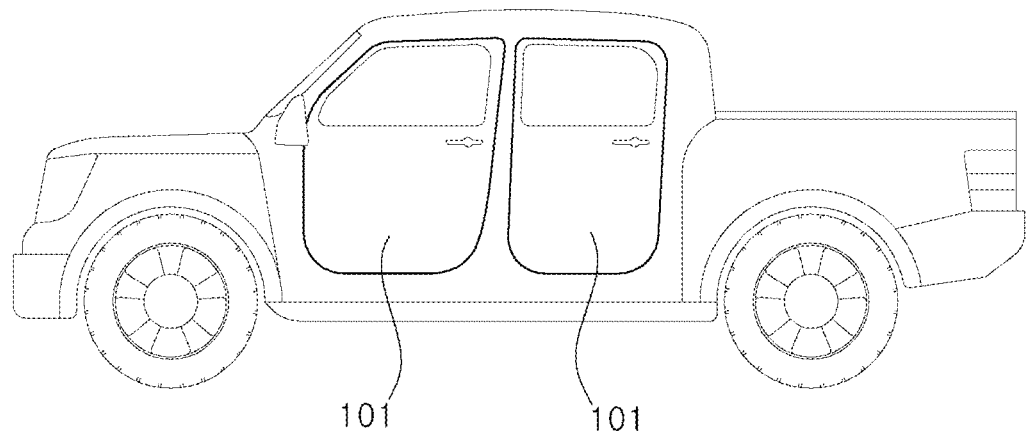
FIG. 1 is a side view illustrating a side surface of a vehicle according to the related art.
Figure 2:
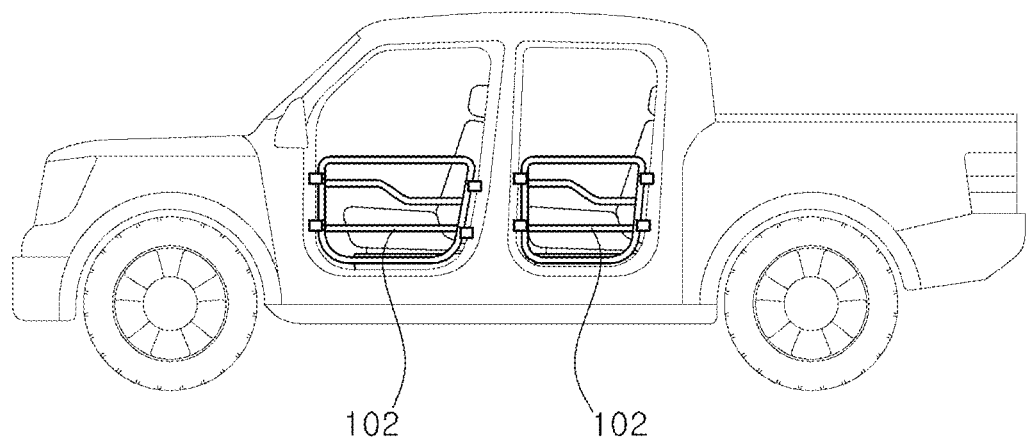
FIG. 2 is a side view of a vehicle illustrating a state in which a door is replaced according to the related art.
Figure 3:
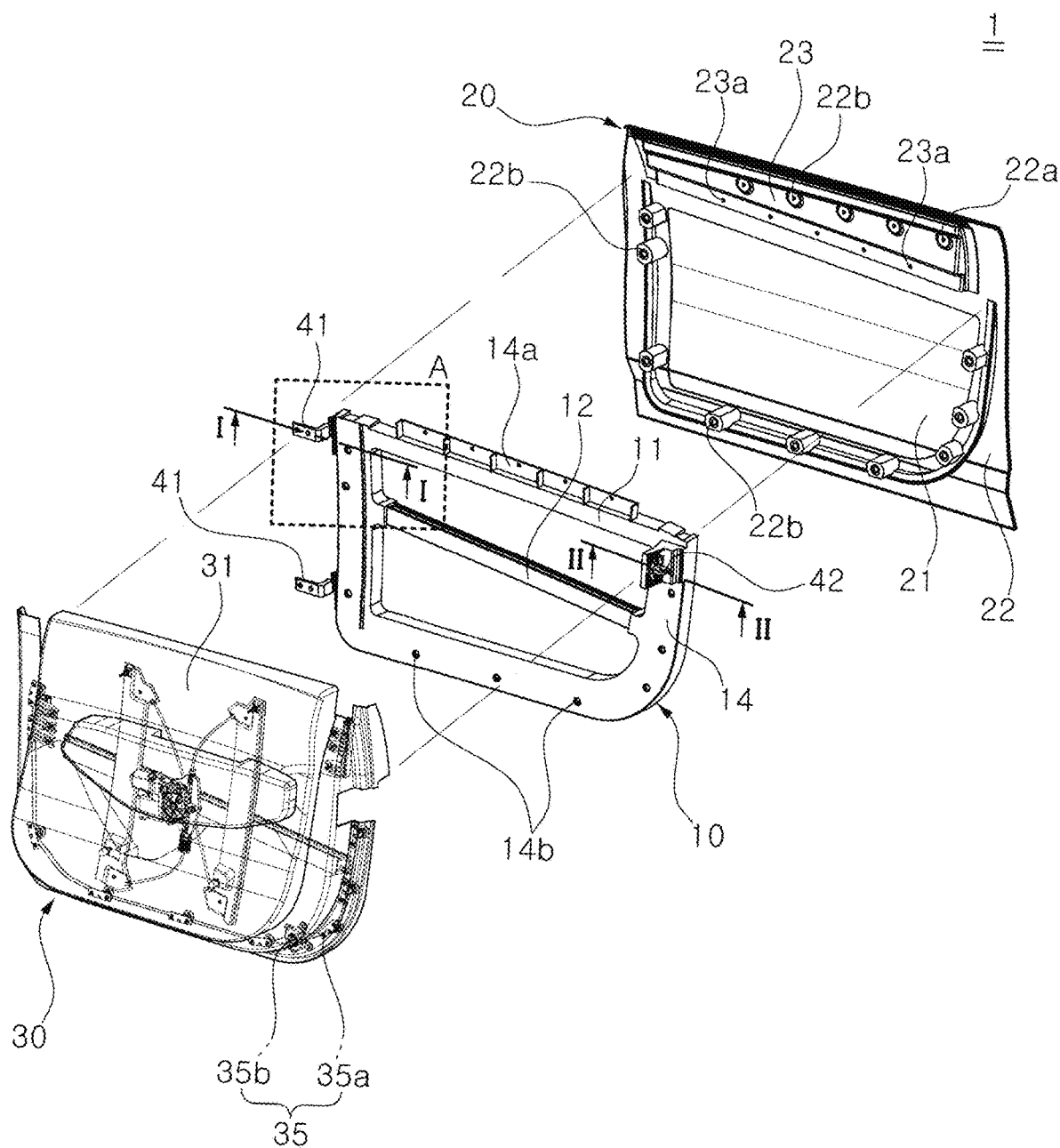
FIG. 3 is an exploded perspective view of a detachable modular type door for a vehicle according to the present disclosure.
Figure 4:
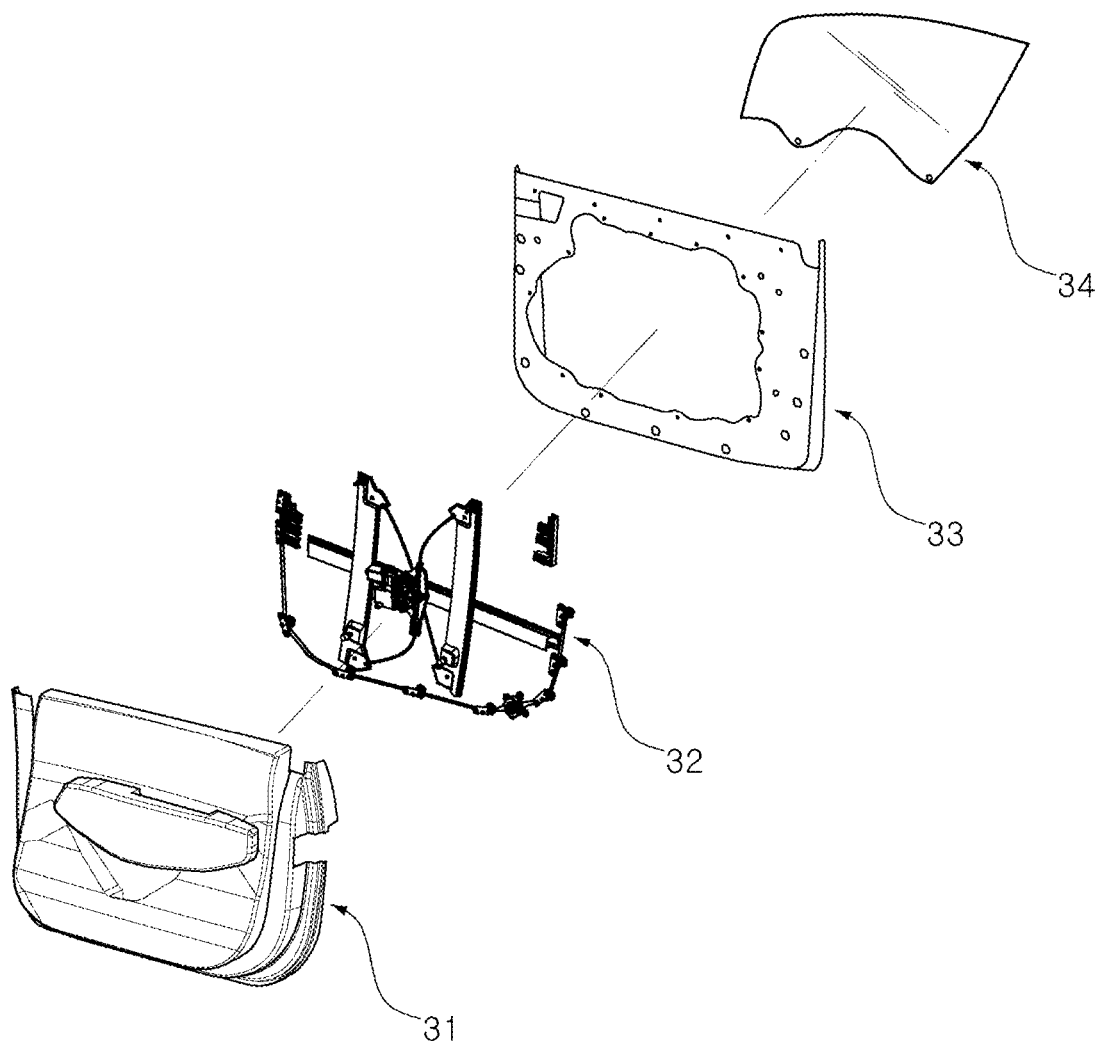
FIG. 4 is an exploded perspective view of an interior module of a detachable modular type vehicle door according to the present disclosure.

Hereinafter, a detachable modular type door for a vehicle according to the present disclosure will be described in detail with reference to the accompanying drawings. When a component, device, or the like of the present disclosure is described as having a purpose or performing an operation, function, or the like, the component, device, or element should be considered herein as being "configured to" meet that purpose or perform that operation or function.

The detachable modular type door 1 for a vehicle according to the present disclosure includes a frame module 10 hinge-connected to a vehicle body (not shown) and configured to be opened and closed. The door 1 also includes a skin module 20 assembled outside the frame module 10 for covering the outside of the frame module 10. The door 1 also includes an interior module 30 disposed inside the frame module 10, configured to cover the inside of the frame module 10, and assembled to the skin module 20 through the frame module 10 interposed therebetween.

The frame module 10 may be hinge-connected to the vehicle body to be opened and closed.

The frame module 10 may include a main frame 11 that is formed along a perimeter of the frame module 10 and fastened to a door hinge 41. The frame module 10 may also include an internal frame 12 located inside the frame module 10 and having both end portions fastened to the main frame 11. The frame module 10 may also include a frame cover 14 made of a plastic material for covering the outside of the frame module 10.

The main frame 11 may form an exterior of the frame module 10 to constitute a basic skeleton of the door 1. The main frame 11 may constitute a perimeter of the frame module 10, which is manufactured by processing a pipe so that the frame module 10 or the door 1 itself has a desired rigidity.

The internal frame 12 may be located inside the main frame 11 and may have both end portions fastened to the main frame 11. The internal frame 12 may be formed across the inside of the main frame 11. The internal frame 12 may reinforce the rigidity of the frame module 10 or support a collision load in the event of a collision. Since the frame module 10 may need to help secure a safe or crash-worthy space for occupants inside the vehicle by supporting the collision load in the event of a collision, the internal frame 12 may serve to reinforce the rigidity of the frame module 10. The internal frame 12 may be integrated with the main frame 11 through welding.

Figure 5:
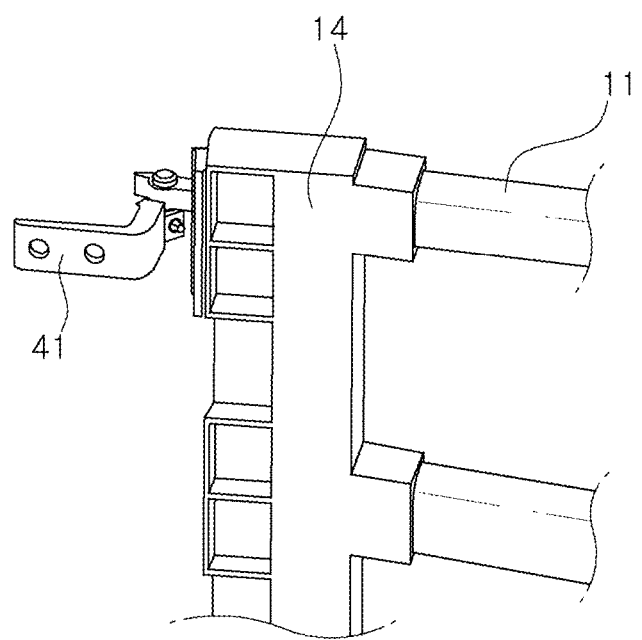
FIG. 5 is a perspective view illustrating portion A of the detachable modular type door in FIG. 3.
Figure 6:
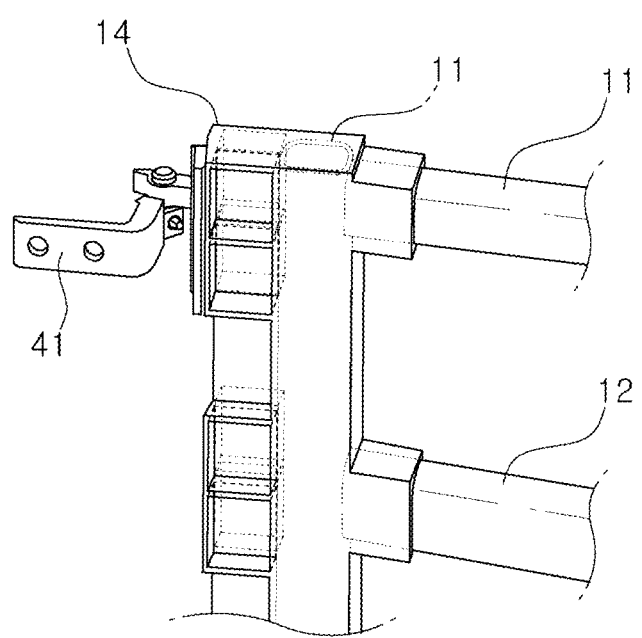
FIG. 6 is a projected perspective view illustrating portion A of the detachable modular type door in FIG. 3.

The frame cover 14 may cover the main frame 11 and the internal frame 12 as illustrated in FIGS. 5 and 6. In order to maximize a sense of openness while driving, the skin module 20 and the interior module 30 may be removed from the vehicle body. The vehicle may be used in an outdoor environment such as a rough terrain in a state in which only the frame module 10 is mounted. Since the main frame 11 and the internal frame 12 are fastened by welding, the frame cover 14 may cover the welded portion of the main frame 11 and the internal frame 12 to improve the outer appearance thereof. In addition, since the frame cover 14 is made of a plastic material and is manufactured by an injection molding process, the frame cover 14 may be fabricated into a desired shape according to a user's choice. Also, components which may be easily and detachably assembled to the skin module 20 or the interior module 30 may be applied to the frame cover 14 according to a user's choice.

Figure 9:
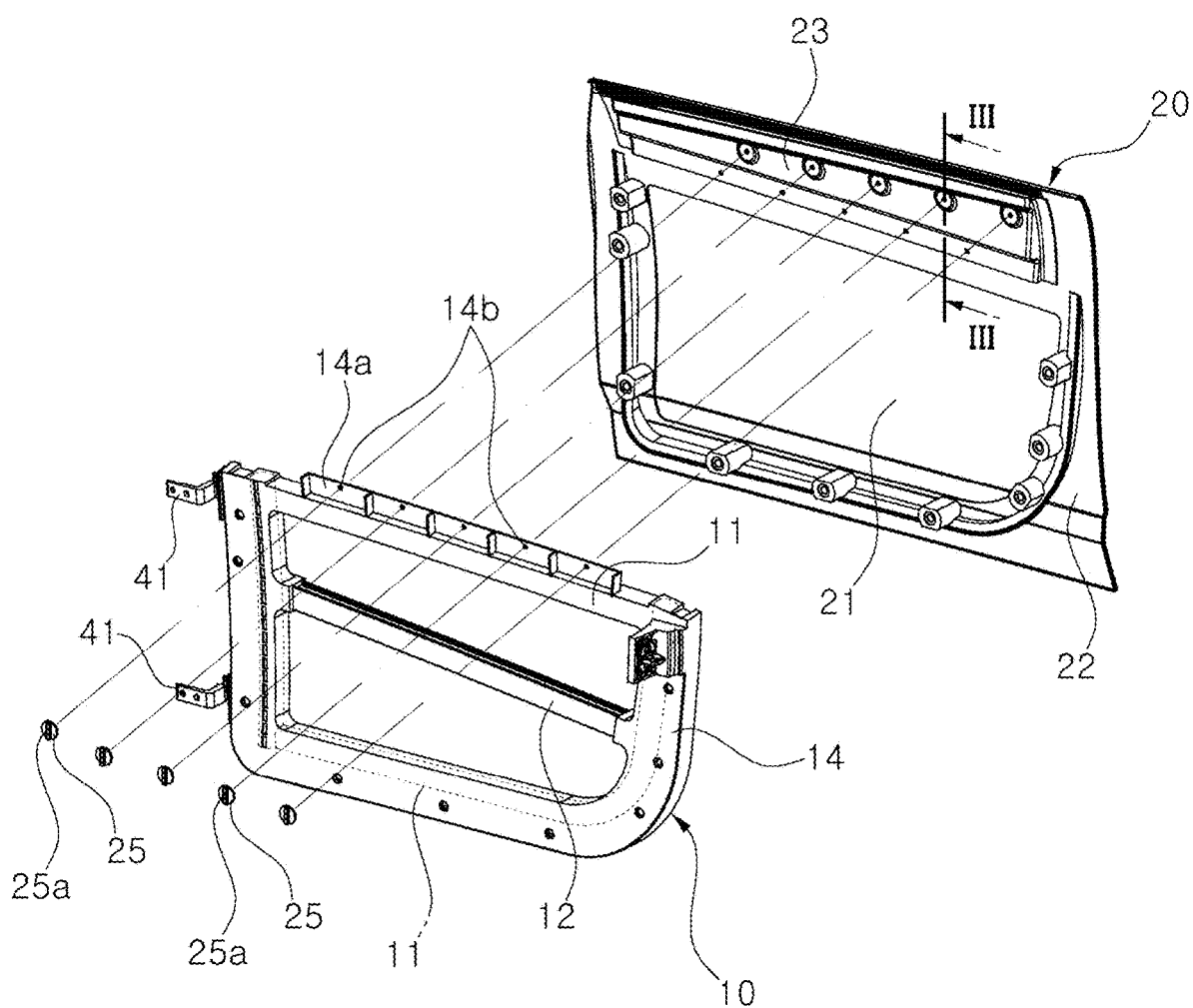
FIG. 9 is an exploded perspective view illustrating the relationship in which a frame module is assembled to a skin module in a detachable modular type vehicle door according to the present disclosure.

For example, referring to FIG. 9, a flange part 14a extends upward from an upper portion of the frame cover 14 and a through hole 14b through which a locking lever 25 passes is formed in the flange part 14a for assembling the frame module 10 to the skin module 20. The locking lever 25 may pass through the through hole 14b of the flange part 14a and may be fixed to the locking member 24 installed on the skin module 20.

In addition, a plurality of through holes (not shown) may also be formed in a perimeter of the main frame 11 so that the fastening member 35a of the interior module 30 passes through each of such the through hole. Thus, the interior module 30 may be used for assembling the frame module 10 to the skin module 20.

Figure 7:
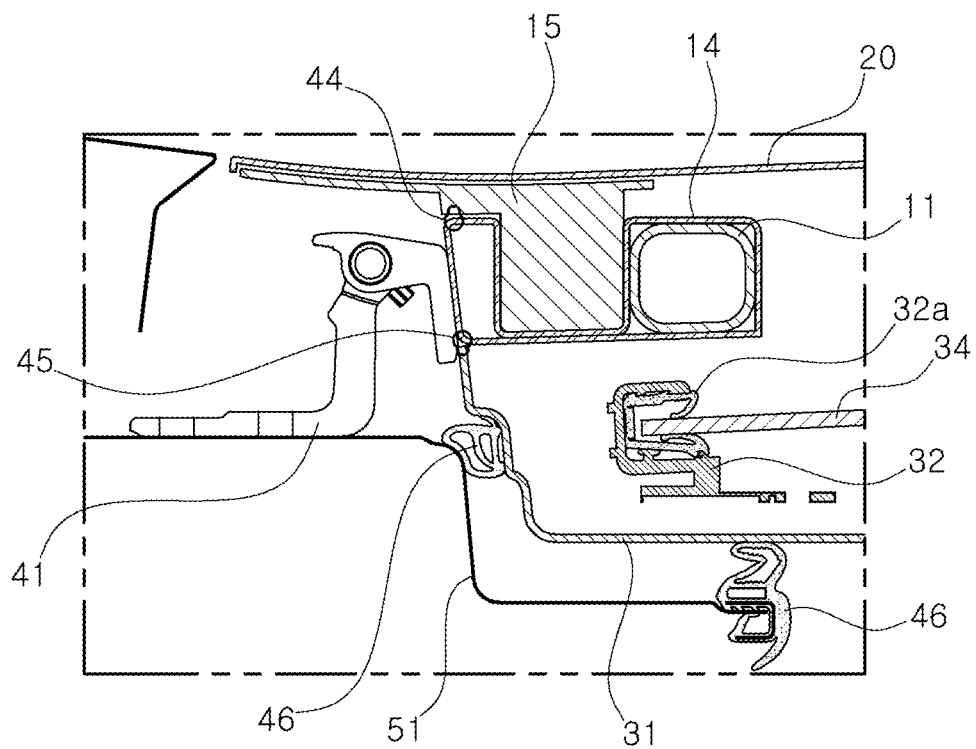
FIG. 7 is a cross-sectional view along line I-I of the detachable modular type door in FIG. 3.

Meanwhile, FIG. 7 illustrates a portion in which the door 1 is hinge-connected to the vehicle body. The main frame 11 may be fastened to the door hinge 41 through the frame cover 14 to be hinge-connected to the vehicle body, such as a body inner panel 51, to be opened and closed. The skin module 20 may be located outside the frame module 10, and the interior module 30 may be located inside the frame module 10. The frame cover 14 may be provided with an outer reinforcement 15 and, for airtightness between the door 1 and the body, an outer reinforcement sealing 44, an interior module sealing 45, and a weather strip 46, and the like may be applied to the frame cover 14.

Figure 8:
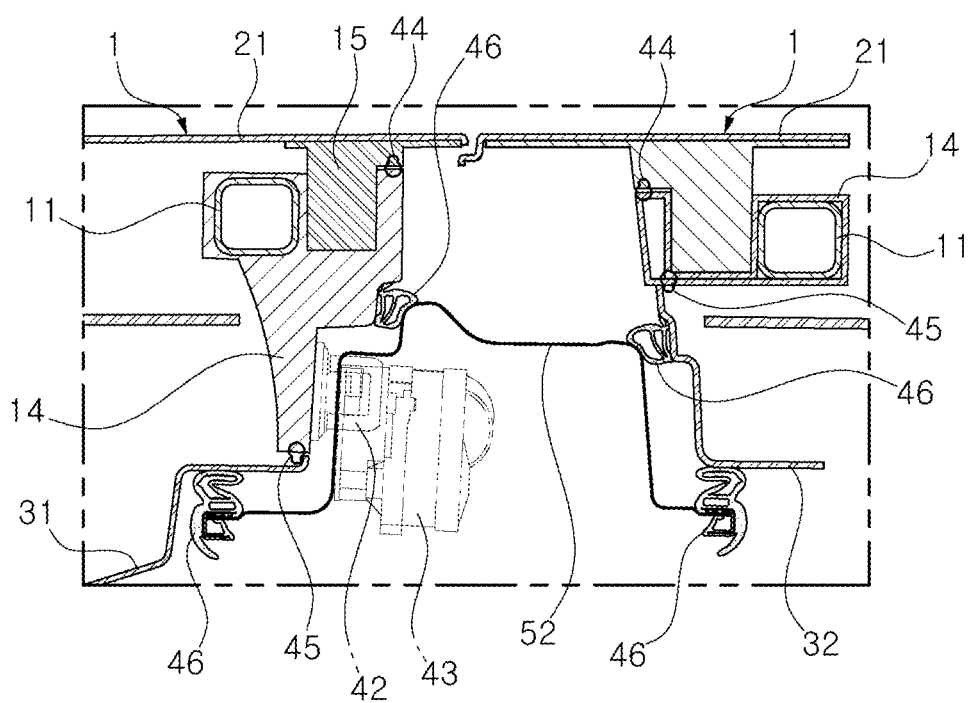
FIG. 8 is a cross-sectional view along line II-II of the detachable modular type door in FIG. 3.

FIG. 8 illustrates a portion in which the door 1 is locked to the vehicle body. The main frame 11 may be locked or unlocked to a door latch 43, which is installed on a center pillar outer panel 52 by being fastened to a door striker 42 through the frame cover 14. In order to avoid interference with other components when the interior module 30 is attached or detached, the door striker 42 may be installed at the frame module 10 side and the door latch 43 may be installed at the vehicle body side.

The skin module 20 may include a skin panel 21 that exposed to the outside of the skin module 20 and a fastening panel 22 disposed inside the skin panel 21, attached to the skin panel 21, and coupled to the interior module 30.

The skin panel 21 may form an exterior of the skin module 20. When the skin module 20 is assembled to the frame module 10, the skin panel 21 may form an exterior surface of the door 1.

The fastening panel 22 may be provided inside the skin panel 21 to reinforce the rigidity of the skin panel 21. In addition, the fastening panel 22 may allow the skin module 20 to be assembled to the frame module 10 or the interior module 30.

The skin panel 21 and the fastening panel 22 may be made of a plastic material and may be integrated by being joined with an adhesive.

A belt rail 23 may be formed in a longitudinal direction of the vehicle and may be attached to an inner upper portion of the fastening panel 22. The belt rail 23 may be applied to a portion in which the fastening panel 22 or the skin panel 21 is assembled to the frame module 10 to reinforce the rigidity thereof.

Figure 12:
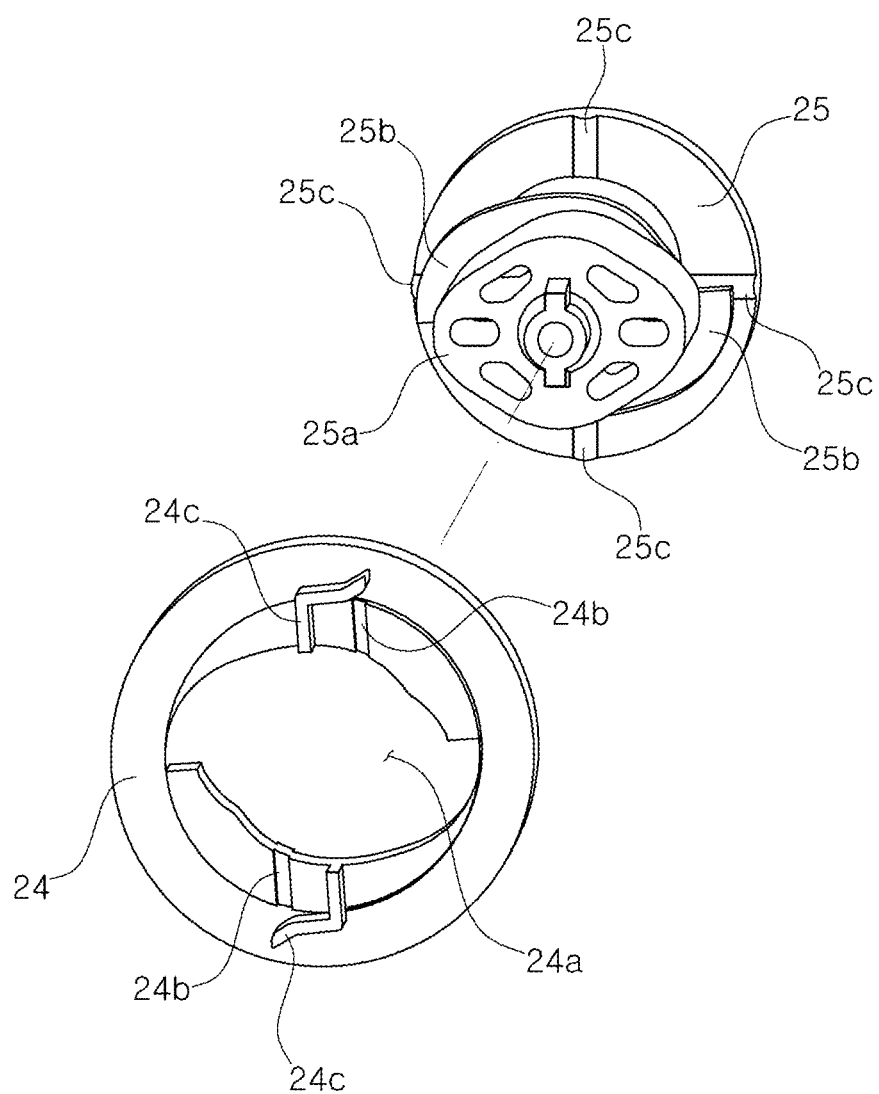
FIG. 12 is a schematic diagram illustrating a fastening member and a fastening lever in a detachable modular type vehicle door according to the present disclosure.
Figure 13:
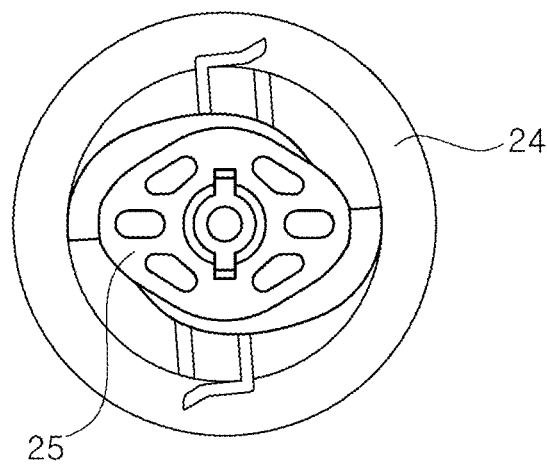
FIG. 13 is a schematic diagram illustrating a state before the fastening member and the fastening lever of FIG. 12 are fastened in a detachable modular type vehicle door according to the present disclosure.
Figure 14:
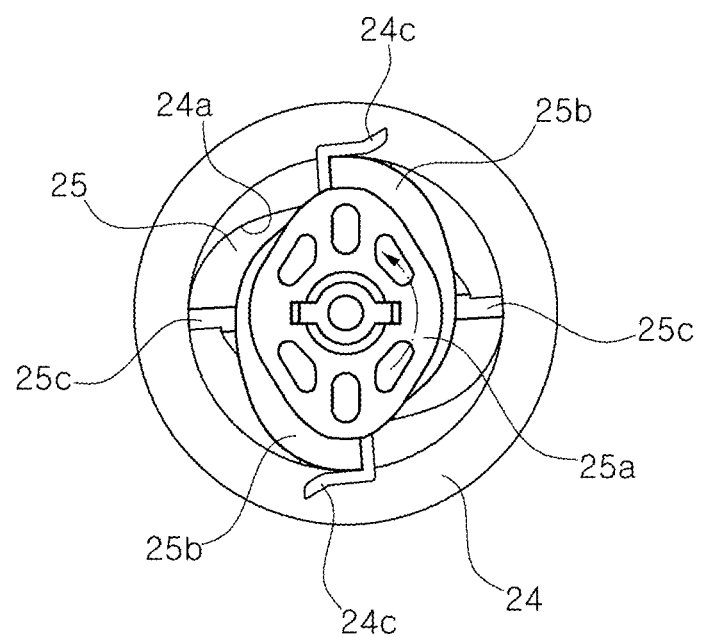
FIG. 14 is a schematic diagram illustrating a state in which the fastening member and the fastening lever of FIG. 13 are fastened in a detachable modular type vehicle door according to the present disclosure.
Figure 15:
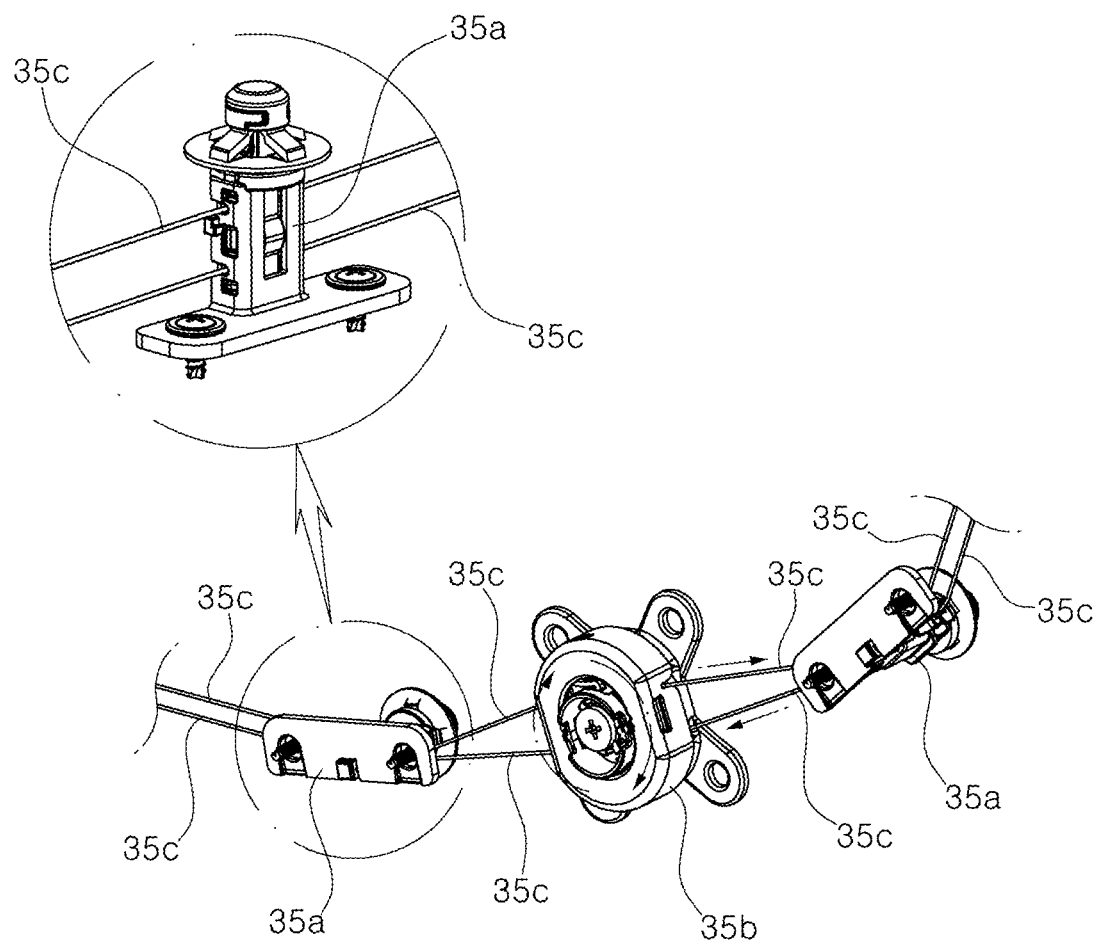
FIG. 15 is a schematic diagram illustrating a fastening unit in a detachable modular type vehicle door according to the present disclosure.

The locking lever 25 and the locking member 24 may allow the skin module 20 to be assembled to the frame module 10 or dissembled therefrom. FIGS. 12-14 illustrate details of the locking lever 25 and the locking member 24.

The locking member 24 may be installed inside the fastening panel 22. A portion of the fastening panel 22 in which the locking lever 25 and the locking member 24 are fastened, respectively, may be formed to protrude in an inward direction of the vehicle. The locking member 24 may be located on such portion. A fixing hole 24a may be formed in the locking member 24 so that a hooking piece 25b of the locking lever 25 passes through the fixing hole 24a and is fixed by rotation.

A manipulation knob 25a which may be manipulated by the user may be formed on one side of the locking lever 25, and the hooking piece 25b locked to the locking member 24 may be formed on an opposite side thereof. The hooking piece 25b may be formed to have a diameter as varying at different angles, rotation angles, of the manipulation knob 25a, e.g., may have an oval shape. The fixing hole 24a of the locking member 24 may be formed in the same shape as the perimeter of the hooking piece 25b corresponding to a shape of the hooking piece 25b. Therefore, when the locking lever 25 is rotated so that the shape of the fixing hole 24a matches the shape of the hooking piece 25b, the hooking piece 25b may pass through the fixing hole 24a. Thereafter, when the locking lever 25 is further rotated and the hooking piece 25b is misaligned with the fixing hole 24a, the hooking piece 25b may not pass through the fixing hole 24a and may be constrained by the fixing hole 24a. In this way, a locking state of the locking lever 25 may be maintained.

A stopper 24c may be additionally formed on the locking member 24 to prevent further rotation of the locking member 24 in the locking state.

In addition, first and second hooking protrusions 24b and 25c may be formed on the locking member 24 and the locking lever 25, respectively, to maintain the locking state in which the locking lever 25 is fixed to the locking member 24. The first and second hooking protrusions 24b and 25c are formed on contacting surfaces of the locking member 24 and the locking lever 25 to protrude toward each other. When the locking lever 25 is fixed to the locking member 24 by rotation, the locking lever 25 may be prevented from rotating in an opposite direction.

A reference hole 22a and a plurality of coupling holes 22b for assembling with the interior module 30 may be formed on the fastening panel 22.

Only one reference hole 22a may be formed at an upper corner portion of the fastening panel 22, and the plurality of coupling holes 22b may be formed at intervals along the perimeter of the fastening panel 22. A portion of the fastening panel 22 in which the reference hole 22a and the coupling holes 22b are formed may be formed to protrude in the inward direction of the vehicle. The fastening members 35a of the fastening unit 35 may be inserted into each of the plurality of coupling holes 22b so that the skin module 20 and the interior module 30 may be assembled with each other.

In particular, a washer hole 22c may be formed in the portion of the fastening panel 22 in which each of the coupling holes 22b is formed. A washer 26 is fitted into each of the washer holes 22c through which the fastening members 35a pass. The washer holes 22c may be formed as an elongated hole bigger than the respective coupling holes 22b.

Since only one reference hole 22a is formed and the washer hole 22c is provided in the form of an elongated hole, when the skin module 20 and the interior module 30 are assembled to the frame module 10, thermal deformation due to a change in temperature of the skin module 20 may be absorbed and tolerated based on the reference hole 22a.

Figure 20:
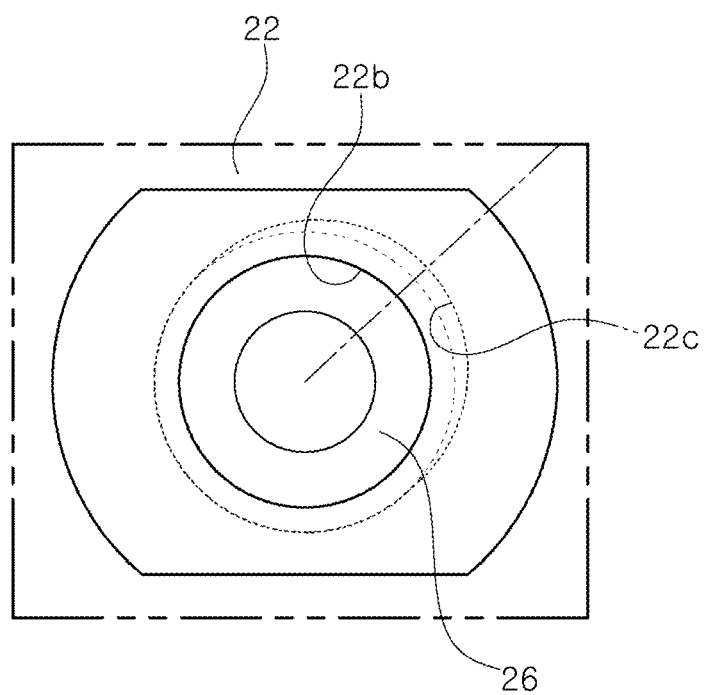
FIG. 20 is a cross-sectional view along line IV-IV of the portion B of the detachable modular type door in FIG. 19.
Figure 21:
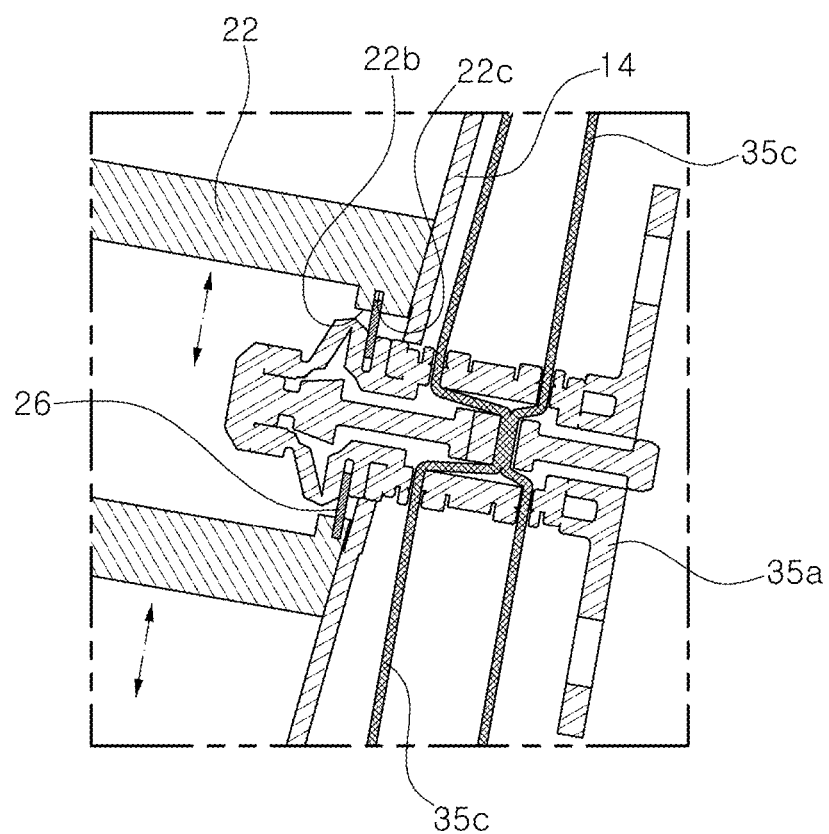
FIG. 21 is a schematic cross-sectional view illustrating a state in which a washer is installed in a coupling hole in portion C of the detachable modular type door in FIG. 18.

In other words, the washer holes 22c may be in the form of the elongated hole against a virtual line (dash line in FIG. 20) connecting, i.e., intersecting the reference hole 22a with a center of the washer holes 22c. Referring to FIG. 20, it may be seen that the washer holes 22c may be formed in the form of the elongated hole with a long axis along the virtual line, i.e., not formed as a perfect circle. An angle of the virtual line connecting the reference hole 22a to the center of the washer holes 22c may be changed depending on the location of the coupling hole 22b or the washer hole 22c. Therefore, the washer holes 22c formed on the perimeter of the fastening panel 22 may have the long axes arranged radially about the reference hole 22a, and thus may absorb thermal deformation occurring in the fastening panel 22. In FIG. 21, the thermal deformation of fastening panel 22 may be guided in the direction of the arrows.

The interior module 30 may be disposed inside the frame module 10 to cover the inside of the frame module 10 and may be assembled to the skin module 20 with the frame module 10 interposed therebetween.

Referring to FIG. 7. the interior module 30 may include a window glass 34 installed on a glass run 32a of the door 1 to move up and down. The interior module 30 may also include a regulator 32 for moving the window glass 34 up and down. The interior module 30 may also include a trim piece or trim 31 exposed to the inside or interior of the vehicle 10, an inner panel 33 to which a regulator 32 and the trim 31 are assembled, and a fastening unit 35 coupled to the skin module 20 and installed on the trim 31.

The inner panel 33 may be manufactured by processing a metal panel so that components such as the regulator 32 or the like may be installed. The inner panel 33 may be formed in a shape in which an area, except for necessary portions to install the components, may be perforated to have openings in order to reduce the weight.

The trim 31 may be exposed to the inside of the vehicle. The trim may be formed by processing a plastic material or additionally attaching another material thereto.

The fastening unit 35 may include a plurality of fastening members 35a passing through the frame module 10, fitted into the reference hole 22a and each of the coupling holes 22b formed in the fastening panel 22 of the skin module 20, and installed at intervals. The fastening unit 35 may include a wire 35c connecting and interworking the fastening members 35a and may include a manipulation lever 35b rotatably installed at one side of the trim 31 for manipulating the wire 35c by rotation.

The plurality of fastening members 35a may be disposed at positions corresponding to the reference hole 22a and the coupling holes 22b formed in the fastening panel 22. When the interior module 30 is assembled to both the frame module 10 and the skin module 20, the fastening members 35a may be inserted into the reference hole 22a and each of the coupling holes 22b. The fastening member 35a may be formed to have an increased diameter when compressed by rotation and fixed to the reference hole 22a and the respective coupling holes 22b.

The wire 35c may allow the plurality of fastening members 35a to be operated in conjunction with each other. The wire 35c may be disposed to pass through each of the fastening members 35a and, when the plurality of wires 35c is operated, to rotate simultaneously to fix or separate the reference hole 22a to or from the coupling holes 22b.

The wire 35c may be moved by rotation of the manipulation lever 35b by the user.

A boot operating adjustment (BOA) system developed by Boa Technology, Inc. may be applied to the manipulation lever 35b and the wire 35c. Therefore, when the manipulation lever 35b is rotated, the wire 35c may be operated to simultaneously operate the fastening members 35a.

The operation of the detachable modular type door for a vehicle according to the present disclosure having the above configuration is described as follows.

FIG. 9 illustrates an assembling process of the frame module 10 and the skin module 20.

The skin module 20 may be assembled to the frame module 10. The belt rail 23 of the skin module 20 is arranged to match the flange part 14a of the frame module 10.

Figure 10:
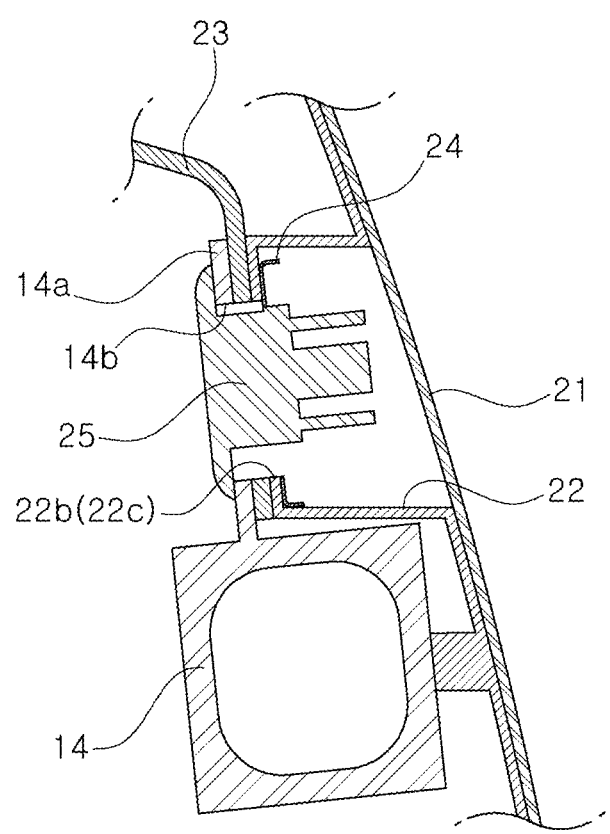
FIG. 10 is a cross-sectional view along line III-III of the detachable modular type door in FIG. 9 illustrating a pre-fastening state after the skin module is mounted.

When the belt rail 23 matches the flange part 14a, the locking lever 25 may pass through the flange part 14a and the belt rail 23 (see FIGS. 10 and 13).

Figure 11:
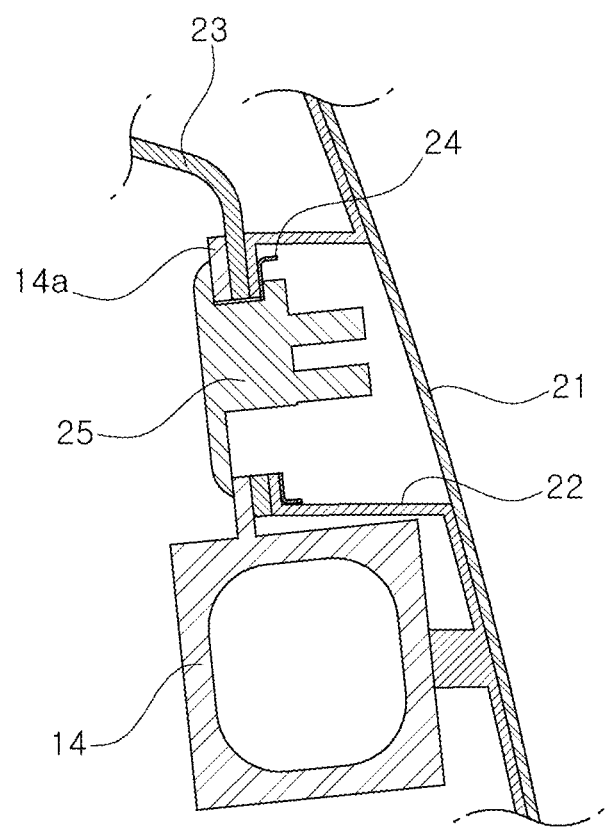
FIG. 11 is a cross-sectional view along line III-III of the detachable modular type door in FIG. 9 illustrating a post-fastening state after the skin module is mounted.

Since the locking lever 25 passes through the belt rail 23 and the flange part 14a, the skin module 20 may be coupled to the frame module 10, maintaining a state of not detaching from the frame module 10. In this state, the locking lever 25 may be rotated to fix the locking lever 25 to the locking member 24 by allowing the hooking piece 25b of the locking lever 25 to pass through the fixing hole 24a of the locking member 24. Here, even when the locking lever 25 further rotates, the hooking piece 25b may not pass through the fixing hole 24a and may enter a locking state (see FIGS. 11 and 14).

Next, the interior module 30 may be assembled in a state in which the skin module 20 is already assembled to the frame module 10.

The interior module 30 may be fixed to an opposite side of the skin module 20 assembled with the frame module 10. The interior module 30 may be pushed to an outward direction of the vehicle so that the fastening member 35a may pass through the frame module 10 and may then be fitted into the skin module 20.

Figure 16:
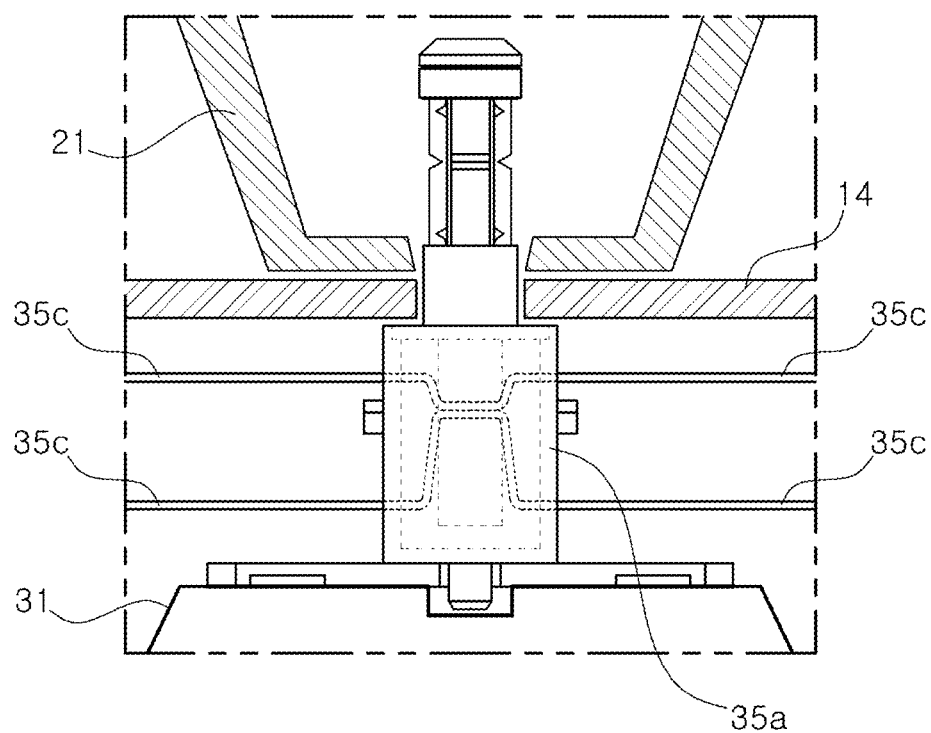
FIG. 16 is a cross-sectional view illustrating a pre-fastening state of the fastening unit of FIG. 15 in a detachable modular type vehicle door according to the present disclosure.
Figure 17:
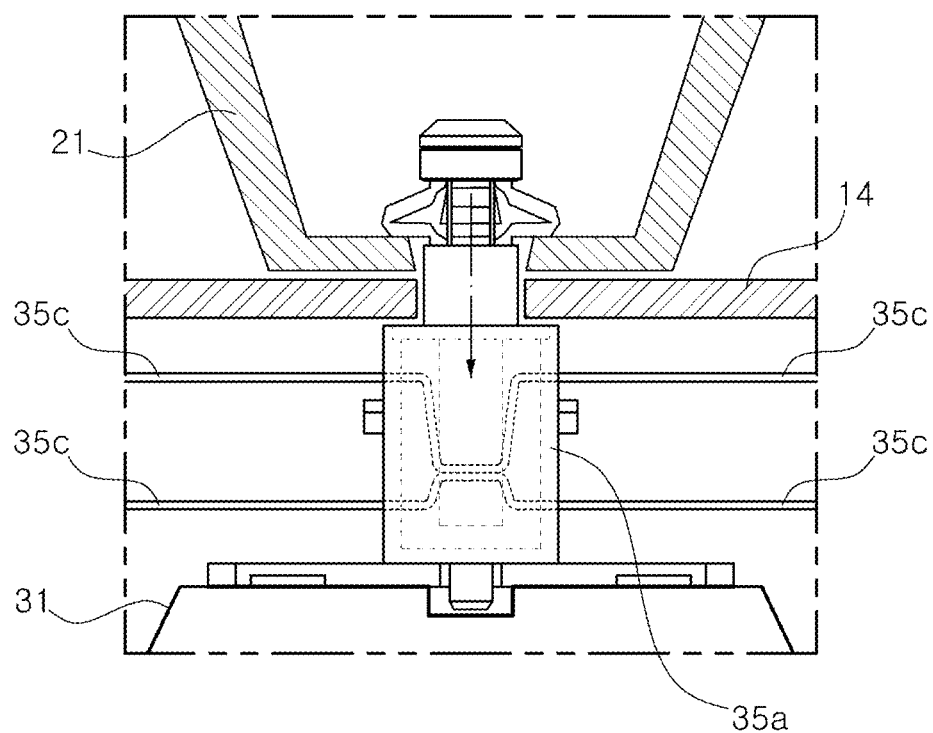
FIG. 17 is a cross-sectional view illustrating a post-fastening state of the fastening unit of FIG. 15 in a detachable modular type vehicle door according to the present disclosure.
Figure 18:
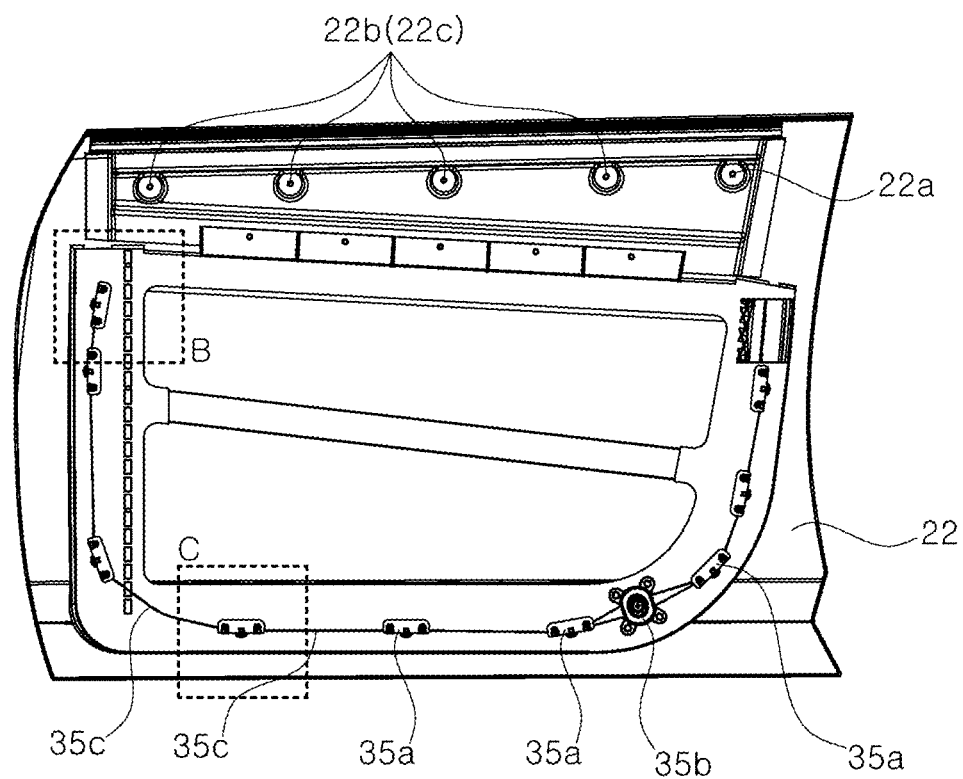
FIG. 18 is a schematic diagram illustrating the coupling relationship between a skin module and a fastening unit in a detachable modular type vehicle door according to the present disclosure.
Figure 19:
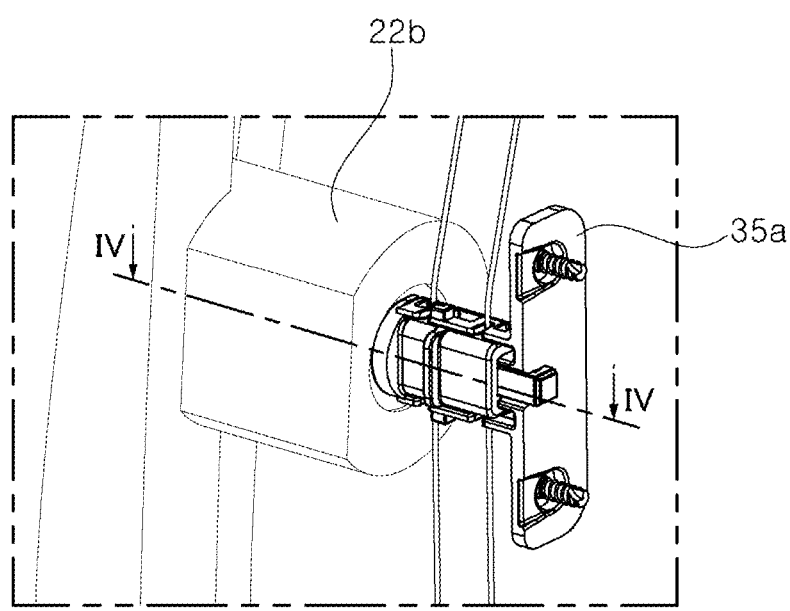
FIG. 19 is a perspective view of portion B of the detachable modular type door in FIG. 18.

In this state, the fastening member 35a may connect the through hole 14b formed in the frame cover 14 of the frame module 10 with the reference hole 22a and the coupling holes 22b of the skin module 20, respectively (see FIG. 16).

In a state in which the interior module 30 is coupled to the frame module 10, the manipulation lever 35b may be rotated to compress the fastening member 35a to expand a diameter of the fastening member 35a. Since the diameter of the fastening member 35a is expanded, the skin module 20 and the interior module 30 may be firmly fixed to the frame module 10, while being in closer contact with the frame module 10.

Therefore, the assembling operation of the skin module 20 and the interior module 30 to the frame module 10 is completed.

Meanwhile, in order to separate the skin module 20 and the interior module 30 from the frame module 10, the interior module 30 may be first separated from the frame module 10 as described below.

First, the manipulation lever 35b may be rotated in a direction opposite to that when mounted, decompressing the fastening member 35a to reduce the diameter of the fastening member 35a. When the diameter of the fastening member 35a is reduced, the fastening member 35a may become in a state of passing through the reference hole 22a and the coupling hole 22b, respectively.

In this state, the interior module 30 may be separated from the frame module 10.

When the separation of the interior module 30 from the frame module 10 is finished, the locking lever 25 may be then rotated to align and enable the hooking piece 25b to pass through the fixing hole 24a.

Thereafter, the skin module 20 may be separated from the frame module 10 by pulling the skin module 20 to the outward direction of the vehicle.

As described above, when the skin module 20 and the interior module 30 are separated from the door 1, only the frame module 10 may remain. Thus, the vehicle may be provided with the extreme sense of openness for the occupants while driving. For example, the vehicle may be driven in a limited situation, e.g., an outdoor environment like a rough terrain in a state in which the sense of openness of the vehicle is maximized.

While several embodiments of the present disclosure have been described with reference to the accompanying drawings, those of ordinary skill in the art should understand that the present disclosure may be carried out in various other specific forms without departing from the inventive concept of the present disclosure and without changing the technical spirit or an essential feature of the present disclosure. Therefore, it should be understood that the above-described embodiments are illustrative in all aspects and do not limit the present disclosure.

What is claimed is:

1. A detachable modular door for a vehicle, the door comprising:
    a frame module hinge-connected to the vehicle and configured to be opened and closed;
    a skin module assembled to the frame module and configured to cover an outside of the frame module;
    an interior module disposed inside the frame module and configured to cover an inside of the frame module and assembled to the skin module with the frame module interposed therebetween,
    wherein the skin module includes
        a skin panel exposed to an outside of the skin module, and
        a fastening panel disposed inside the skin panel, attached to the skin panel, and coupled to the interior module,
    wherein a reference hole consisting of a single aperture is provided at a predetermined position relative to the fastening panel,
    wherein a plurality of coupling holes is provided along a perimeter of the fastening panel at intervals,
    wherein a washer hole is provided in a portion of the fastening panel in which each of the plurality of coupling holes is provided,
    wherein a washer is fitted in each washer hole and a fastening member of a fastening unit coupling the interior module to the skin module is installed on each washer, and
    wherein each washer hole is an elongated hole along a virtual line intersecting a center of each washer hole and the reference hole.

2. The door of claim 1, wherein the frame module includes a main frame formed on a perimeter of the frame module and fastened to a door hinge.

3. The door of claim 2, wherein the frame module further includes an internal frame located inside the frame module and having end portions fastened to the main frame.

4. The door of claim 2, wherein the frame module further includes a frame cover made of a plastic material configured to cover the outside of the frame module.

5. The door of claim 4, wherein a flange part extends upward from an upper portion of the frame cover by a predetermined height.

6. The door of claim 1, further comprising:
    a belt rail attached to an inner upper portion of the fastening panel in a longitudinal direction of the vehicle;

a locking member fixedly installed inside the fastening panel; and
a locking lever passing through a flange part of the frame module and the belt rail and assembled to the locking member to fasten the skin module and the frame module,
wherein the locking lever is rotated to be locked to or unlocked from the locking member.

7. The door of claim 6, wherein:
the locking lever includes a manipulation knob and hooking piece fixed by being hooked to a fixing hole formed in the locking member according to the rotation of the locking lever; and
the fixing hole is configured to allow the hooking piece to pass through or is configured to constrain the hooking piece after the hooking piece passes through the fixing hole.

8. The door of claim 7, wherein the fixing hole has a diameter as varying at different angles of the locking lever, and wherein the fixing hole has a shape corresponding to the hooking piece.

9. The door of claim 7, wherein:
a hooking protrusion protrudes from each of the locking lever and the locking member toward each other to prevent the locking lever from being rotated in an opposite direction when the locking lever is fixed to the locking member; and
a stopper, configured to restrain the rotation of the locking lever, is on the locking member.

10. The door of claim 1, wherein a portion of the fastening panel in which the reference hole and the plurality of coupling holes are provided is constructed to protrude in an inward direction toward the interior of the vehicle.

11. The door of claim 1, wherein the skin panel and the fastening panel are made of a plastic material and joined with an adhesive.

12. A detachable modular door for a vehicle, the door comprising:
a frame module hinge-connected to the vehicle and configured to be opened and closed;
a skin module assembled to the frame module and configured to cover an outside of the frame module; and
an interior module disposed inside the frame module and configured to cover an inside of the frame module and assembled to the skin module with the frame module interposed therebetween,
wherein the interior module includes
a window glass installed on the door to move up and down,
a regulator configured to move the window glass up and down,
a trim disposed to be exposed to an interior of the vehicle,
an inner panel to which the regulator and the trim are assembled, and
a fastening unit installed on the trim for coupling the interior module to the skin module,
wherein a reference hole and a plurality of coupling holes to which the interior module is fastened are formed in a fastening panel,
wherein the fastening unit includes
a plurality of fastening members passing through the frame module, fitted into the reference hole and each of the plurality of coupling holes formed in the fastening panel of the skin module, and installed at intervals,
a wire connecting and interworking the fastening members, and
a manipulation lever rotatably installed at one side of the trim and configured to manipulate the wire by rotation, and
wherein, based on the manipulation lever being rotated, the fastening member is rotated and compressed to expand a diameter of the fastening member in a width discretion and fixed to the reference hole and the plurality of coupling holes.

13. The door of claim 12, wherein:
the frame module includes a main frame formed on a perimeter of the frame module and fastened to a door hinge; and
an internal frame is located inside the frame module and has ends fastened to the main frame to reinforce a rigidity of the frame module or to support a collision load in the event of a collision.

14. The door of claim 13, wherein:
the frame module further includes a frame cover made of a plastic material configured to cover the outside of the frame module.

15. The door of claim 14, wherein the skin module further includes:
a skin panel exposed to an outside of the skin module;
a fastening panel disposed inside the skin panel, attached to the skin panel, and coupled to the interior module;
a locking member fixedly installed inside the fastening panel; and
a locking lever passing through the frame module and assembled to the locking member, wherein the locking lever is configured to rotate to be locked to or unlocked from the locking member.

* * * * *